(12) United States Patent
Du

(10) Patent No.: US 10,473,826 B2
(45) Date of Patent: Nov. 12, 2019

(54) DISPLAY PANEL AND DISPLAY APPARATUS THEREOF

(71) Applicant: BOE TECHNOLOGY GROUP CO., LTD., Beijing (CN)

(72) Inventor: Xiaobo Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 175 days.

(21) Appl. No.: 15/758,095

(22) PCT Filed: Jun. 26, 2015

(86) PCT No.: PCT/CN2015/082458
§ 371 (c)(1),
(2) Date: Mar. 7, 2018

(87) PCT Pub. No.: WO2016/095475
PCT Pub. Date: Jun. 23, 2016

(65) Prior Publication Data
US 2018/0246259 A1  Aug. 30, 2018

(30) Foreign Application Priority Data
Dec. 15, 2014 (CN) .......................... 2014 1 0778482

(51) Int. Cl.
*G02B 3/00* (2006.01)
*G02B 3/08* (2006.01)
(Continued)

(52) U.S. Cl.
CPC ................ *G02B 3/08* (2013.01); *G02B 5/04* (2013.01); *G02F 1/133526* (2013.01);
(Continued)

(58) Field of Classification Search
CPC .... G02B 3/08; G02B 5/04; G02B 2003/0093; G02B 27/0983; G02B 27/09;
(Continued)

(56) References Cited

U.S. PATENT DOCUMENTS

| 2011/0109535 | A1 | 5/2011 | Watanabe et al. |
| 2014/0132488 | A1 | 5/2014 | Kim et al. |
| 2016/0124252 | A1* | 5/2016 | Kim ...................... G09G 3/006 445/3 |

FOREIGN PATENT DOCUMENTS

| CN | 102087814 A | 6/2011 |
| CN | 202650440 U | 1/2013 |

(Continued)

OTHER PUBLICATIONS

International Search Report dated Jun. 26, 2015, issued in counterpart International Application No. PCT/CN2015/082458 (12 pages).

*Primary Examiner* — William Choi
(74) *Attorney, Agent, or Firm* — Westerman, Hattori, Daniels & Adrian, LLP

(57) ABSTRACT

A display panel producing frame-free image displays is provided. The display panel includes a display substrate (1) and an optical device (2) in a light illuminating side of the display substrate (1). The display substrate (1) includes frame edge regions (11) and a display region (12) abutting the frame edge regions (11). The display substrate (1) is curved at the frame edge regions (11). The optical device (2) is above the display region (12) and the frame edge regions (11), and changes a direction of light illuminated by the display substrate (1) such that images displayed through the display region produce a frame-free display.

17 Claims, 2 Drawing Sheets

(51) Int. Cl.
  *G02F 1/1335* (2006.01)
  *G02B 5/04* (2006.01)
  *G02F 1/1333* (2006.01)

(52) U.S. Cl.
  CPC ............... *G02B 2003/0093* (2013.01); *G02F 1/133504* (2013.01); *G02F 2001/133331* (2013.01)

(58) Field of Classification Search
  CPC ............... G02B 27/0938; G02B 27/30; G02F 1/133526; G02F 1/133504; G02F 2001/133331
  USPC .................... 359/592, 641, 648, 741, 742
  See application file for complete search history.

(56) References Cited

FOREIGN PATENT DOCUMENTS

| | | |
|---|---|---|
| CN | 102944951 A | 2/2013 |
| CN | 103366643 A | 10/2013 |
| CN | 103810945 A | 5/2014 |
| CN | 104409020 A | 3/2015 |
| JP | 2010-066706 A | 3/2010 |
| JP | 2010-191246 A | 9/2010 |

\* cited by examiner

DISPLAY PANEL AND DISPLAY APPARATUS THEREOF

CROSS-REFERENCES TO RELATED APPLICATIONS

This PCT patent application claims priority of Chinese Patent Application No. 201410778482.3, filed on Dec. 15, 2014, the entire content of which is incorporated by reference herein.

FIELD OF THE INVENTION

The present invention generally relates to the display technologies and, more particularly, to a display panel and display apparatus containing the same.

BACKGROUND

A current trend is to choose the display devices with the best product design and appearance. The display devices include a wide variety of small-sized, medium-sized, and large-sized display products. For example, an objective in research and development of display devices is to produce "narrow-frame" or even "frame-free" displays in various mobile phones, tablets, and televisions.

In addition, the demand for a wide range of super large-screen displays has also been increasing. Tiled display is often used to implement a super large-screen display. When display devices are joined in a tiled configuration, boundary seam lines or tiling seams may exist in the assembled tiled display. This may cause the overall image to be divided among the seam lines. The divided image may negatively affect the overall quality of the image display. Thus, a frame-free single screen display may be possible if the tiling seams can be eliminated in a display. This type of screen displays would be incorporated into seamless super large-screen display devices.

To obtain a frame-free display, a conventional display panel manufacturing method often installs at least two layers of lenses on top of the display substrate. The conventional method may thus significantly increase the overall thickness of the display panel. Meanwhile, since having multiple lenses may cause certain level of light loss, the conventional method may also significantly reduce the brightness of the displayed image.

In addition, light refraction caused by the two layers of lenses may also cause image distortions.

BRIEF SUMMARY OF THE DISCLOSURE

There is provided a display panel and display apparatus. The display substrate of the display panel is curved at the frame edge regions. An optical device is installed corresponding to the frame edge regions of the display substrate in the display panel to obtain frame-free display. The total thickness of the display panel is thus significantly reduced.

One aspect of the present disclosure includes a display panel. The display panel includes a display substrate providing image displays. The display substrate includes a display region with at least a curved portion and an optical device on a light illuminating side of the display substrate. The optical device includes at least an optical processing portion corresponding to said curved portion of the display substrate to change a direction of light illuminated from the curved portion. The optical processing portion converts divergent light from the curved portion into parallel light.

Optionally, the display substrate is an entirely curved display substrate and the optical device corresponds to the entirely curved display substrate.

Optionally, the entirely curved display substrate has an arc-shaped surface, the light illuminating side of the display substrate is a convex surface of the arc-shaped surface, and the optical device is a convex lens or a prism group installed above the light illuminating side of the display substrate.

Optionally, an orthogonal projection of the optical device along a direction of light illuminated by the display panel and an orthogonal projection of the display substrate along a direction of light illuminated by the display panel overlap.

Optionally, a curvature of the convex lens is same as a curvature of the display substrate.

Optionally, a distance between the optical device and the light illuminating side of the display substrate is about 0 to 10 mm.

Optionally, the frame edge regions are curved toward a direction opposite of the direction of light illuminated by the display substrate such that each of the frame edge regions has an arc-shaped surface, the arc-shaped surfaces project along the direction of light illuminated by the display substrate, the display region is flat, and the optical device is a prism group or a convex lens installed above the corresponding frame edge regions.

Optionally, the optical device is made of glass, polymethyl methacrylate, polycarbonate, methyl styrene, cyclic olefin polymers, polystyrene, polyethylene terephthalate, and/or polyimide amine.

Optionally, the display panel further includes a planar light-transmitting device installed above the display region, wherein the planar light-transmitting device maintains the direction of light illuminated from the display region, and the planar light-emitting device and the optical device are joined as one device.

Optionally, the display substrate is a flexible organic light-emitting diode display substrate, a flexible light-emitting diode display substrate, a flexible liquid crystal display substrate, and/or a flexible electronic paper display.

Optionally, the display panel further includes supporting structures installed between the display substrate and the optical device, wherein the supporting structures are placed at four edges of the light illuminating side of the display substrate to support the optical device.

Another aspect of the present disclosure further provides a display apparatus. The display apparatus includes the display panels described above.

Optionally, the display apparatus includes one or more than one of the display panels described above. The display panels are joined to form a large-screen display.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

In the present disclosure, a display panel includes a display substrate. The display substrate includes a display region and one or more frame regions. The frame regions may be referred to as a frame edge region and/or a bordering edge region. The display region provides an image to be displayed by the display panel. A frame-free image generally refers to a display image (e.g., on the display panel) that is enlarged from the image displayed through the display region of the display substrate such that the displayed image is without a frame (i.e., frame-free) or with reduced frame width(s).

One aspect of the present disclosure provides a display panel.

Figure 1:
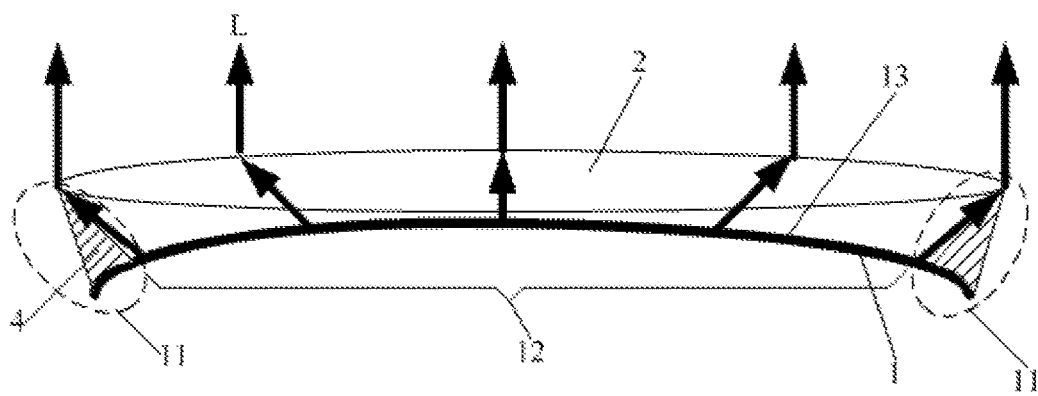
FIG. 1 illustrates an exemplary display panel in embodiment 1 consistent with the disclosed embodiments.

Embodiment 1 provides a display panel. As shown in FIG. 1, the display panel may include a display substrate 1 and an optical device 2 installed on the light-illuminating side of the display substrate 1. The display substrate includes a display region with at least a curved portion and an optical device on a light illuminating side of the display substrate. For example, as shown in FIG. 1, the display substrate 1 may include frame edge regions 11 and a display region 12 surrounded by the frame edge regions 12. The display substrate 1 may be curved at least at the frame edge regions 11.

The optical device 2 includes at least an optical processing portion corresponding to said curved portion of the display substrate. The optical processing portion changes a direction of light illuminated from the curved portion. The optical processing portion converts divergent light from the curved portion into parallel light. For example, the optical device 2 may at least be installed correspondingly above the frame edge regions 11 in order to change the direction of light illuminated from the display substrate 1 (divergent light to parallel light) such that images displayed in the display region 12 can cover the frame edge regions 11.

In embodiment 1, the entire display substrate 1 may be curved. The optical device 2 may correspond to the entirely curved display substrate 1.

For example, the display substrate 1 may refer to a fully functioning display module capable of displaying images. The display substrate 1 may be a flexible OLED (organic light-illuminating diode) display substrate, a flexible LED (light-illuminating diode) display substrate, a flexible LCD (liquid crystal display) display substrate, a flexible EPD (electronic paper display) display substrate, and/or any suitable flexible display module capable of displaying images.

The display substrate 1 can be entirely curved such that the light illuminated by the display substrate 1 may have an expanded illumination range when displaying images. In addition, the optical device 2 may change the direction of the light illuminated by the display substrate 1. Thus, the display panel 1 can display images in an area greater than the display area of the display panel 11. For example, areas of the display panel corresponding to the frame edge regions 11 may also be able to display images. The images displayed by the display panel can thus cover the frame edge regions 11 to obtain frame-free display of the display panel.

In embodiment 1, the entire display substrate 1 may be curved and form an arc-shaped surface. The light illuminating surface 13 of the display substrate 1 may be the convex surface (i.e., bulging or projecting outward) of the arc-shaped surface. The optical device 2 may be a convex lens or a prism group installed correspondingly above the light illuminating surface 13. In embodiment 1, the optical device 2 can be a convex lens. When the display panel is displaying images, light illuminated by the arc-shaped display substrate 1 may exit from the light illuminating surface 13 along the normal direction of the light illuminating surface 13 such that the illuminated light can have a divergent configuration. Compared to a flat display substrate, the light illuminated from the arc-shaped light illuminating surface 13 may have an increased illumination area.

The divergent light may be transmitted to the convex lens and undergo refraction through the convex lens. By selecting convex lens with an appropriate curvature and adjusting the distance between the convex lens and the light illuminating surface 13, the divergent light beams after refraction can become parallel light beams along the L direction. Since light illuminated from the light illuminating surface 13 can have an expanded illumination area, the displayed images formed by the light (i.e., the light for displaying images) passing through the convex lens may expand outward and have an expanded display area. By selecting suitable curvatures for the arc-shaped light illuminating surface 13 and the convex lens, and adjusting the distance between the convex lens and the light illuminating surface 13 to an appropriate value, the displayed images can fully cover the frame edge regions 11 of the display substrate 1. A frame-free display can be obtained for the display panel.

As described above, the frame-free display for the display panel may require only a layer of convex lens on the light illuminating side of the display substrate 1. Also, the thickness of the display substrate 1, e.g., a flexible display substrate 1, may be desirably thin (e.g., often less than or equal to 100 μm) such that the thickness of the display panel in the disclosed embodiment may be significantly less than the thickness of a conventional frame-free display panel. In addition, since the display panel in the disclosed embodiment 1 may only require one layer of convex lens, the transmission rate of the light for displaying images of the display panel disclosed may be higher than the transmission rate of the light for displaying images of a conventional display panel. This may avoid significant brightness reduction in the displayed image. Meanwhile, compared to a conventional display panel with two layers of lenses, the display panel in the present disclosure may have improved image rendition. The disclosed embodiment may reduce or avoid image distortions. Further, the display panel of the disclosed embodiment may be easier to manufacture.

In one embodiment, the orthogonal projection of the convex lens along the direction of the illuminating light of the display panel and the orthogonal projection of the display substrate 1 along the direction of the illuminating light of the display panel may overlap. It should be noted that, in embodiment 1, the direction of the illuminating light of the display panel may be perpendicular to the surface of the display panel such that light illuminated from the light illuminating surface 13 of the display substrate 1 can all pass through the convex lens. The above arrangement can produce frame-free displays. The resulting display panel is also easier to package.

In embodiment 1, the curvature of the convex lens may be the same as the curvature of the display substrate 1. By selecting the appropriate curvatures, displayed images formed by the displaying light (i.e., light for display images) passing through the convex lens may not generate distortions (e.g., enlarged images, shrunk images, and/or distorted images). Thus, the embodiments consistent with the disclosure can realize frame-free display and ensure desirable image display effects at the same time.

In embodiment 1, the distance between the convex lens and the light illuminating surface 13 can be about 0 to 10 mm. For frame edge regions 11 with varying widths, when the curvature of the arc-shaped light illuminating surface 13 is fixed, by adjusting the distance between the convex lens and the light illuminating surface 13, displayed images can cover frame edge regions 11 with varying widths to obtain frame-free displays.

It should be noted that, the optical device 2 could also be a prism group installed correspondingly above the light illuminating surface 13. Light can undergo refraction when passing through the prism group so the prism group may function the same way as the convex lens described above. Given the condition that the prism group functions the same way as the convex lens, since the thickness of the prism group may be less than the thickness of the convex lens, using a prism group may further reduce the thickness of the display panel.

It should be noted that, the optical device 2 should not be limited to a convex lens and a prism group. Other suitable optical devices capable of realizing the function of the convex lens or the prism group as described above are also within the scope of the present disclosure.

In embodiment 1, the optical device 2 can be made of glass, polymethyl methacrylate, polycarbonate, methyl styrene, cyclic olefin polymers, polystyrene, polyethylene terephthalate, and/or polyimide amine. An optical device 2 made of organic light resins can be more wear resistant and more robust. It should be noted that the material of the optical device 2 are not limited to the above materials. The optical device 2 can be made of any suitable rigid material with a certain refractive index. The optical device 2 may only need to be capable of changing the transmission direction of the light illuminated through the display substrate 1 to obtain frame-free displays.

In embodiment 1, supporting structures 4 may be installed between the display substrate 1 and the optical device 2. The supporting structures 4 may be placed correspondingly at the four edges of the light illuminating side of the display substrate 1 to support the optical device 2. The supporting structures 4 can keep a fixed distance between the display substrate 1 and the optical device 2 such that the optical device 2 can change the transmission direction of the light illuminated through the display substrate 1 according to a certain manner (e.g., a certain direction). Thus, images displayed by the display region 12 do not have a frame produced by the frame edge regions 11 through the lighting processing device 2.

Figure 2:
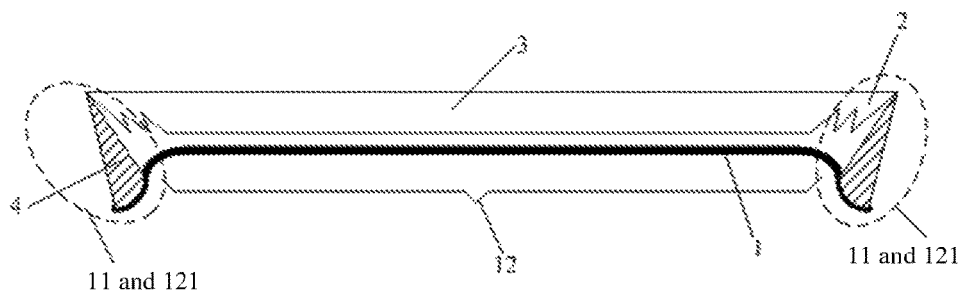
FIG. 2 illustrates an exemplary display panel in embodiment 2 consistent with the disclosed embodiments.
Figure 3:
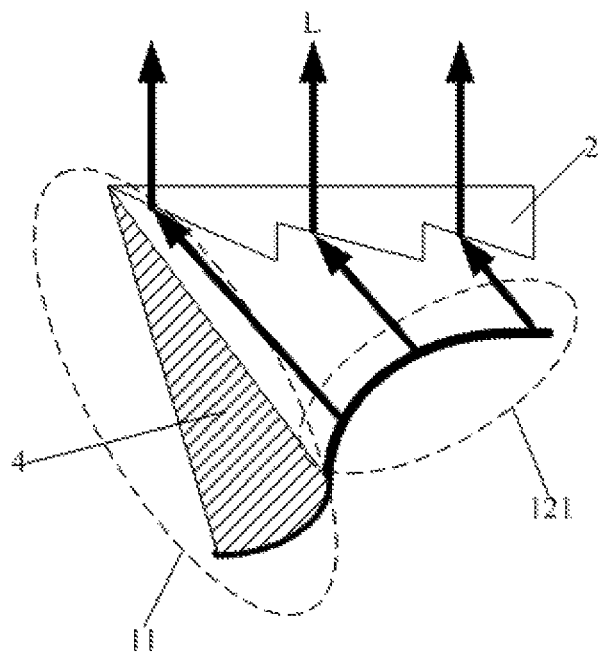
FIG. 3 illustrates schematics of a frame corner region of the display panel of embodiment 2 consistent with the disclosed embodiments.

Embodiment 2 provides a display panel, as shown in FIGS. 2 and 3. In embodiment 2, the display substrate of the display includes a display region with at least a curved portion and an optical device on a light illuminating side of the display substrate. For example, different from the display panel provided by embodiment 1, as shown in FIGS. 2 and 3, the frame edge regions 11 of the display panel in embodiment 2 may be curved toward a direction opposite of the direction of the light illuminating direction of the display substrate 1. The frame edge regions 11 may each have an arc-shaped surface and the arc-shaped surfaces may project or bulge toward the light illuminating direction of the display substrate 1. The display region 12 may be flat.

The optical device includes at least an optical processing portion corresponding to said curved portion of the display substrate to change a direction of light illuminated from the curved portion. For example, the optical device 2 may be a prism group and/or a convex lens placed correspondingly above the frame edge regions 11. In embodiment 2, the optical device 2 may be a prism group.

As shown in FIG. 3, the frame edge regions 11 may be curved such that the bordering edge regions 121 connecting the display region 12 and the frame edge regions 11 may have certain curved surfaces. When displaying images, light illuminated from the curved bordering edge regions 121 may transmit along the normal direction of the curved surface of the display substrate. Thus, the light illuminated from the bordering edge regions 121 may have a divergent configuration. Compared to a flat display substrate, the display substrate 1 with curved frame edge regions 11 may illuminate light in an expanded area. The divergent light may transmit to the prism group and undergo refraction by the prism group. By selecting a prism group with a suitable refractive index and adjusting the distance between the prism group and the bordering edge regions 121, the refraction light may become parallel along the L direction. Since light illuminated from the bordering edge regions 121 may have an expanded illumination area, displayed images formed by the light passing through the prism group may expand outward. By selecting suitable curvatures for the bordering edge regions 121 and the prism group, and adjusting the distance between the prism group and the bordering edge regions 121 to a suitable value, the displayed images may fully cover the frame edge regions 11 of the display substrate to obtain frame-free display for the display panel.

The frame-free display panel described above may only require one layer of prism group. The prism group may be placed above the corresponding frame edge regions 11. By arranging the placement of the prism group, the total thickness of the display panel can the further reduced.

In embodiment 2, the orthogonal projections of the prism group along the direction of the illuminating light of the display panel and the orthogonal projection of the frame edge regions 11 along the direction of the illuminating light of the display panel may overlap. In embodiment 2, the direction of the illuminating light of the display panel may be perpendicular to the surface of the display panel such that light illuminated from the bordering edge regions 121 can all pass the prism group. The above arrangement can ensure frame-free displays and easier packaging of the entire display panel at the same time.

In embodiment 2, the curvature of the frame edge regions 11 may be larger than or equal to 20 mm. The curvature can prevent the display substrate 1 from being cracked or broken during a curving or bending process. The curvature may enable easier packaging and desirable curving reliability of the display panel.

In embodiment 2, the distance between the prism group and the frame edge regions 11 may be about 0 to 10 mm. For frame edge regions 11 with varying widths, when the curvature of the frame edge regions 11 is fixed, by adjusting the distance between the prism group and the bordering edge regions 121, display images can be frame-free (without a frame around an image caused by the frame edge regions 11) with varying widths.

In embodiment 2, the display panel may further include a planar light-transmitting device 3 installed above the corresponding display region 12. The planar light-transmitting device 3 may not change the direction of light illuminated from the display region 12. The planar light-transmitting device 3, however, may change the directions of the light illuminated from the bordering edge region 121, as shown in FIG. 3. The planar light-transmitting device 3 and the optical device 2 can be integrated as one device. By joining the planar light-transmitting device 3 and the optical device 2, images displayed by the display region 12 may have desirably high image rendition. Image distortions may also be prevented or reduced.

It should be noted that, the optical device 2 may also be a convex lens. The convex lens may function the same way as the prism group. When using a convex lens, the curvature of the convex lens may be the same as the curvature of the frame edge regions 11 such that image distortions (e.g., enlarged images, shrunk images, and/or distorted images) caused by the displaying light (i.e., light for displaying images) passing through the prism group can be avoided or reduced. Thus, disclosed embodiments can provide frame-free as well as high quality image displays at the same time.

It should also be noted that, the optical device 2 should not be limited to a convex lens and a prism group. Any suitable optical devices capable of realizing the function of the above convex lens or the prism group are within the scope of the present disclosure.

The material and other structures of the display panel in embodiment 2 may be the same as the display panel in embodiment 1. The details of the relevant materials and structures are thus not repeated herewith.

The display panels described in embodiments 1 and 2 have many advantages. In the display panels described in embodiments 1 and 2, by at least curving the display substrates in the frame edge regions, frame-free display may be obtained by placing an optical device over the frame edge regions of each of the corresponding display substrate. The above arrangements may significantly reduce the total thickness of the display panels. In addition, by installing only one layer of light processing device in the display panel, light loss can be reduced, light transmission rate can be improved, and brightness reduction of the displayed image may be curtailed. Meanwhile, compared to a conventional method, the installation of only one layer of light processing device in the display panel can also improve the image renditions of the display panel and avoid image distortions. The disclosed display panels may also be easier to manufacture.

Another aspect of the present disclosure provides a display apparatus.

Embodiment 3 provides a display apparatus. The display apparatus includes a display panel described in embodiment 1 or embodiment 2.

In embodiment 3, the display apparatus may only include one display panel, i.e., the display apparatus may be a single-screen display apparatus. By using the display panel described in embodiment 1 or embodiment 2, the single-screen display apparatus may produce frame-free image displays.

The display apparatus can include a plurality of display panels joined to form a super large-screen display. Since each display panel used for the super large-screen display may be the display panel as disclosed in embodiment 1 or embodiment 2. Tiling seams may be reduced or eliminated in the joined super large-screen display. Thus, embodiments consistent with the present disclosure provide display apparatus with improved display effects.

The display apparatus provided in the present disclosure may be any product or component with a display function. For example, the display apparatus can be a LCD panel, a LCD TV, a monitor, an OLED panel, an OLED TV, a mobile phone, and/or a navigation system, etc.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A display panel providing image displays, comprising:
   a display substrate having a display region with at least a curved portion; and
   an optical device on a light illuminating side of the display substrate,
   wherein the optical device comprises at least an optical processing portion corresponding to said curved portion of the display substrate for changing a direction of light illuminated from the curved portion, the optical processing portion converting divergent light from the curved portion into parallel light,
   the display substrate is a curved display substrate;
   the curved display substrate has an arc-shaped surface;
   the light illuminating side of the display substrate is a convex surface of the arc-shaped surface; and
   the optical device is a convex lens or a prism group above the display substrate on the light illuminating side.

2. The display panel according to claim 1, wherein an orthogonal projection of the optical device along a direction of light illuminated by the display panel and an orthogonal projection of a display region of the display substrate along a direction of light illuminated by the display panel overlap.

3. The display panel according to claim 1, wherein a curvature of the convex lens is the same as a curvature of the display substrate.

4. The display panel according to claim 1, wherein a distance between the optical device and the light illuminating side of the display substrate is about 0 to 10 mm.

5. The display panel according to claim 1, wherein the display substrate is one of a flexible organic light-emitting diode display substrate, a flexible light-emitting diode display substrate, a flexible liquid crystal display substrate, a flexible electronic paper display, or a combination thereof.

6. The display panel according to claim 1, further including supporting structures between the display substrate and the optical device, wherein the supporting structures are placed at four edges of the light illuminating side of the display substrate to support the optical device.

7. A display apparatus, including a display panel according to claim 1.

8. A display apparatus, including a plurality of display panels according to claim 1, wherein the display panels are joined to form a large image display.

9. The display panel according to claim 1, wherein:
   a display region of the display substrate includes curved bordering edge regions and a flat display area abutting the curved bordering edge regions.

10. The display panel according to claim 9, wherein the light illuminated from the curved bordering edge regions transmits along the normal direction of the curved surface, and has a divergent configuration.

11. The display panel according to claim 10, wherein the displayed images are enlarged images of images displayed through the display region of the display substrate such that the display panel displays reduced frame width or frame-free images, by selecting curvatures for the bordering edge regions and a prism group of the optical device and adjusting the distance between the prism group and the bordering edge regions.

12. A display panel providing image displays, comprising:
a display substrate having a display region with at least a curved portion; and
an optical device on a light illuminating side of the display substrate,
wherein the optical device comprises at least an optical processing portion corresponding to said curved portion of the display substrate for changing a direction of light illuminated from the curved portion, the optical processing portion converting divergent light from the curved portion into parallel light,
frame edge regions of the display substrate are curved toward a direction opposite of the direction of light illuminated by the display substrate such that each of the frame edge regions has an arc-shaped surface, and
the optical device is a prism group or a convex lens above the corresponding frame edge regions.

13. The display panel according to claim 12, wherein an orthogonal projection of the optical device along a direction of light illuminated by the display panel and an orthogonal projection of a display region along a direction of light illuminated by the display panel overlap.

14. The display panel according to any of claim 12, wherein the orthogonal projection of the optical device along the direction of light illuminated by the display panel and an orthogonal projection of the display substrate along the direction of light illuminated by the display panel overlap.

15. The display panel according to claim 12, wherein:
a curvature of the convex lens is same as a curvature of the frame edge regions; and
the curvature of each frame edge region is larger than or equal to 20 mm.

16. The display panel according to claim 12, wherein:
a distance between the optical device and the frame edge regions is about 0 to 10 mm.

17. The display panel according to claim 12, further including a planar light-transmitting device above the display region, wherein:
the planar light-transmitting device maintains the direction of light illuminated from the display region; and
the planar light-emitting device and the optical device are joined as one device.

* * * * *